(No Model.)

J. ASKINS.
Car Brake.

No. 238,831. Patented March 15, 1881.

Witnesses.
A. Ruppert
C. M. Connell

Inventor:
J. Askins
Holloway & Blauck
Atty

UNITED STATES PATENT OFFICE.

JOSEPH ASKINS, OF ELIDA, OHIO.

CAR-BRAKE.

SPECIFICATION forming part of Letters Patent No. 238,831, dated March 15, 1881.

Application filed December 29, 1880. (No model.)

*To all whom it may concern:*

Be it known that I, JOSEPH ASKINS, a citizen of the United States, residing at Elida, in the county of Allen and State of Ohio, have invented certain new and useful Improvements in Car-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in car-brakes, it being designed more particularly for use upon freight-cars; and the object of my improvement is to provide a novel combination of devices which, when thus combined, constitute a car-brake. I attain this object by the mechanism illustrated in the accompanying drawings, in which—

Figure 1:
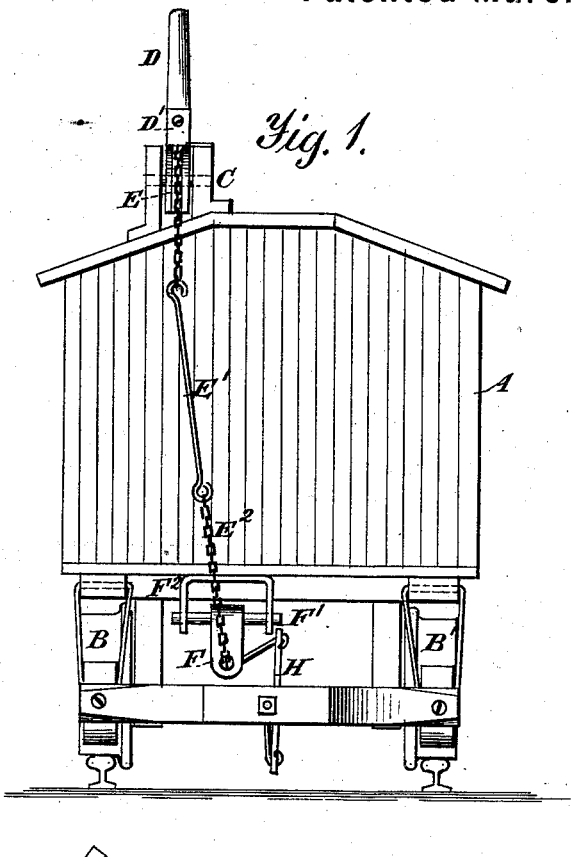
Figure 3:
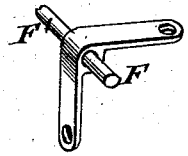
Figure 2:
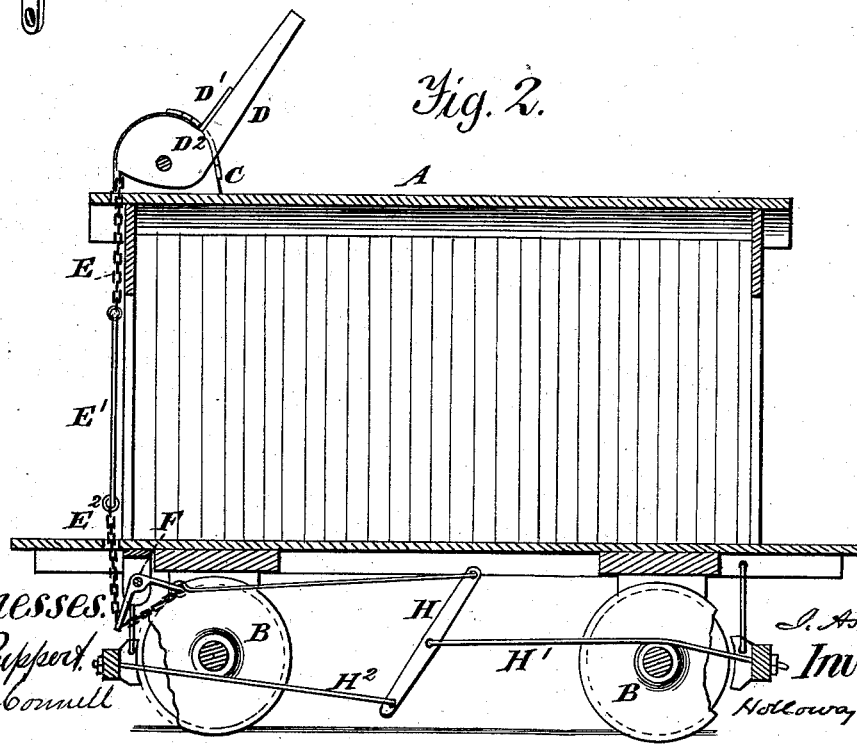

Figure 1 is an end view of a car, showing my improvements applied thereto. Fig. 2 is a side elevation, showing a car, the lever on the top thereof, a chain extending therefrom to the bell-crank lever placed underneath the car, and showing also the rods and lever for applying the brakes; and Fig. 3 is a perspective view of the bell-crank lever and shaft.

Similar letters refer to similar parts in all of the views.

My improved brake is applicable to any of the forms of cars now in use and to new ones, whether their bodies rest upon four wheels, as shown in the drawings, or upon two trucks, in the usual manner.

To the roof of a car, A, which, in the example shown, rests upon four wheels, B, there is placed a bracket, C, to which the lever D is pivoted. This bracket has two upwardly-projecting ears, as shown in Fig. 1, one of which is provided upon its upper surface with notches or a ratchet for the reception of the edge of a plate of metal, D', placed upon the upper surface of the lever D, the purpose of which is to hold the lever in position when it is brought into the proper one to apply the brake. The inner end of the lever D, above referred to, has upon it a projection, $D^2$, the upper surface of which is rounded, as shown, and has formed in it a groove for the reception of a chain. The projection $D^2$ constitutes the short arm of the lever, and owing to its form it takes up a large portion of the chain which passes over it, and at the same time enables the operator to apply a great amount of force to the brake.

To that portion of the projection $D^2$ which is nearest to the long arm D of the lever there is attached a chain, E, which passes over the upper surface of said projection and down for some distance at the end of the car, and is united to a rod, E', the lower end of which is attached to a chain, $E^2$, the opposite end of which is attached to a bell-crank lever, F, said lever being secured to a shaft, F', the ends of which rest in a yoke, $F^2$, which is bolted to the body of the car or to the dead wood attached thereto. The forward end of lever F is provided with an aperture, through which the chain $E^2$ passes, and from which it extends rearward and is connected to a rod, G, as shown in Fig. 2, the forward or outer end of said rod being secured to the inner end of lever F, while its opposite end is attached to the suspended lever H, to the center of which there is connected a rod, H', which extends therefrom to the rear brake-beam of the car, through which it passes, its outer end being provided with a screw-thread and nut, by which the brake-shoe on its end can be placed nearer to the wheels as they are worn away. From the lower end of lever H there extends a rod, $H^2$, the outer end of which passes through the brake-beam at that point, it being supplied with a thread and nut for the same purpose as that on rod H'. The brake-beams are supported upon or suspended by links in the usual manner; or they may be suspended in other approved manner.

The parts constituting my improvements are combined and arranged substantially as shown in Fig. 2, whereby, when the operator, standing or sitting upon the top of the car, bears down the rear end or long arm of lever D, the chain F is made to pass over the projection on its short arm, by which it is taken up and is made to act through the connecting rods and chains upon the brakes.

Having thus described my invention, what I claim, and desire to secure by Letters Patent, is—

The combination, in a braking mechanism for cars, of the lever D, connecting chain and rod, bell-crank lever F, lever H, and rods H' and H², the parts being arranged for joint operation in connection with the brakes of a car, substantially as set forth.

In testimony whereof I affix my signature in presence of two witnesses.

JOSEPH ASKINS.

Witnesses:
  JOHN H. BROMDEN,
  WM. ASKINS.